(12) United States Patent
De Giuseppe

(10) Patent No.: US 8,440,289 B2
(45) Date of Patent: May 14, 2013

(54) COMPOSITE FOR GEOTECHNICS, BUILDING AND THE LIKE, WITH IMPERMEABLE LAYER

(75) Inventor: Giulio De Giuseppe, Vigano' (IT)

(73) Assignee: Tenax S.p.A., Vigano' (IT)

( * ) Notice: Subject to any disclaimer, the term of this patent is extended or adjusted under 35 U.S.C. 154(b) by 0 days.

(21) Appl. No.: 12/738,186

(22) PCT Filed: Oct. 28, 2008

(86) PCT No.: PCT/EP2008/064617
§ 371 (c)(1),
(2), (4) Date: Apr. 15, 2010

(87) PCT Pub. No.: WO2009/056548
PCT Pub. Date: May 7, 2009

(65) Prior Publication Data
US 2010/0233427 A1    Sep. 16, 2010

(30) Foreign Application Priority Data
Nov. 2, 2007   (IT) .............................. MI2007A2113

(51) Int. Cl.
*B32B 3/00*     (2006.01)
*B32B 3/28*     (2006.01)
*B32B 3/30*     (2006.01)

(52) U.S. Cl.
USPC ............ 428/167; 428/156; 428/166; 428/172

(58) Field of Classification Search .................. 428/156, 428/167, 172, 188, 166, 99, 100, 101; 405/129.57, 405/129.7, 129.85, 36, 39, 302.7
See application file for complete search history.

(56) References Cited

U.S. PATENT DOCUMENTS
5,258,217 A    11/1993   Lewis
5,891,549 A     4/1999   Beretta et al.

FOREIGN PATENT DOCUMENTS
EP           0 836 929 A1    4/1998
JP           05272124 A  *  10/1993
WO    WO 2004/074590 A      9/2004

* cited by examiner

*Primary Examiner* — Catherine A Simone
(74) *Attorney, Agent, or Firm* — Novak Druce Connolly Bove + Quigg LLP

(57) ABSTRACT

A composite for geotechnics and building, with an impermeable layer, comprising a sheet element that is impermeable to fluids and has, monolithically therewith, elements that protrude on the first and second faces, on at least one of the faces there being a layer that is integrally coupled to the protruding elements to form, at the first and/or second faces, two separate drainage and/or protection and/or grip systems adapted to withstand intense compression along a direction that is substantially perpendicular to the sheet element.

44 Claims, 10 Drawing Sheets

COMPOSITE FOR GEOTECHNICS, BUILDING AND THE LIKE, WITH IMPERMEABLE LAYER

TECHNICAL FIELD

The present invention relates to a composite for geotechnics, building and the like, with impermeable layer.

BACKGROUND ART

As is known, geotechnics, building and the like typically use impermeable layers or elements which have the function of covering other materials or being covered by them.

Usually, the impermeable elements are provided by membranes made of medium- or high-density polyethylene, which are covered by, or cover, materials such as soil, waste, sludge, natural elements, concrete and so forth.

In the field of building, membranes are used both vertically and horizontally which are designed to isolate or separate the building from the ground, so as to create an isolation and drainage element.

In the geotechnical field, the membranes are used in the construction of landfills, both as waste containment elements that render the basin impermeable, and as elements for covering and sealing the landfill once it has been saturated.

In the first application, the membrane is covered and protected by additional spacers, which have the purpose of preventing perforations or damage caused by the covering material and allow to drain the sludge that is present on the bottom and also to block any leaks.

The spacers with draining and protective function are usually geocomposites, i.e., products constituted by the joining of plastic net and fabrics.

In the second application, the membrane, which is arranged to cover saturated landfills, is covered by additional spacers and then by soil, so as to drain rainwater at the upper face and fermentation gases at the lower face.

The spacers with protective draining function are typically geocomposites, i.e., products constituted by the joining of plastic nets and fabrics, or natural elements such as gravel or sand.

In all the cases cited above, the first purpose is to prevent the covering or covered materials from coming into contact with the membrane that must be protected, while the second purpose is to drain liquids and gases between the membrane and the covering or covered material.

With the solutions currently used, it is therefore necessary to use several separate elements, which are coupled one another at installation time, creating a multilayer element which substantially has at the center a smooth or corrugated membrane, which constitutes the impermeable separation element, while on the upper face there is a protective draining layer constituted by a geocomposite or by natural elements and, at the lower layer, by an additional protective draining layer, also provided by a geocomposite or by natural elements.

The use of mutually separate elements generates several problems of interaction and corresponding friction when the layers are applied to an inclined plane, due to the possibility of slippage of the covering material on the geocomposite and/or of the geocomposite on the membrane and/or of the membrane on the underlying geocomposite and/or of the geocomposite on the covered material.

To avoid the risk of severe collapses and damage, in current solutions the basin of the landfill or its covering must be provided with limited slopes.

Currently, the most widely used membranes are those that are smooth or slightly corrugated in order to increase their degree of friction with the covering materials.

Membranes are also commercially available which have protrusions on one or both faces, but these membranes too must be subsequently covered or cover layers of geocomposites or fabrics or natural elements in order to achieve the combination that is capable of protecting the membrane and of draining liquids and gases.

In particular, U.S. Pat. No. 5,258,217 provides a membrane that has conical or cylindrical elements both on the lower surface and on the upper surface, but additional layers are superimposed without binding on such protruding elements at installation time, so as to be able to provide both the protection function and the drainage function.

Another problem further consists in that the protrusions are very sparse and often have such dimensions that they do not constitute spacers adapted to protect the membrane.

Accordingly, the installation of such a membrane, with the need to apply the geocomposites subsequently, entails high costs, and the problems of interfacing between the membrane and the elements that are moved close to it remain unsolved.

The solution does not allow to provide draining systems, but facilitates grip between the sheath and the superimposed elements.

Other known solutions provide membranes that are preformed during the extrusion step, so that the membrane no longer appears flat but has studs shaped like a half-cone, which are matched by hollows on the other face; however, such preformed membranes, used predominantly in the building industry, have very low thicknesses and accordingly are fragile and must be coupled to fabrics in order to provide a draining system, which most of the times is ineffective due to the compressibility of the structure itself, so that the draining effect is limited exclusively to the side where the studs are convex, whereas on the other side the fabric adheres to the concavity, with consequent stagnation of liquids.

The spacing between the studs is such that the draining capacity is very limited and decreases significantly as the load increases.

These solutions, which do not allow to drain both liquids and gases, have no grip capacity and friction between the membrane and the covered material is absent.

There are also membranes provided with protruding elements on one face, such as for example the ones shown in U.S. Pat. No. 5,891,549 and U.S. Pat. No. 6,972,269, but these products allow to provide a draining spacer system only at one face, and therefore it is necessary to use them in combination with other draining elements on the other face and install them separately.

The face that has no protrusions has no grip characteristics and makes the membrane potentially slippery on the covered material, and accordingly does not solve the problem of the interface between the membrane and the geocomposite that is applied to one of the two sides.

DISCLOSURE OF THE INVENTION

The aim of the invention is to solve the problem described above, by providing a composite for geotechnics, building and the like, which is constituted by an impermeable layer provided with a double draining or draining and gripping system that allows to facilitate installation greatly, solving the problem that derives from the interface of a plurality of superimposed layers.

Within this aim, an object of the invention is to provide a composite that allows the possibility to provide one or more protective draining and/or gripping systems at the two faces and is consequently very practical and versatile in use.

Another object of the invention is to provide a composite in which different types of fabrics, nets or membranes of different grammages and composition, according to the requirements of the case and to the type of the sheet-like element used, are provided on the outer faces.

Another object of the invention is to provide, on the two faces of the composite, two different types of materials as a function of the requirements of the case, for example cross-linked material on the upper face and woven material on the lower face, or woven fabric above and non-woven fabric below, or fabric above and membrane below.

Another object of the present invention is to provide a composite which, thanks to its particular constructive characteristics, is capable of giving the greatest assurances of reliability and safety in use.

Still another object of the present invention is to provide a composite for geotechnics, building and the like with an impermeable layer, which can be obtained easily starting from commonly commercially available elements and materials and is furthermore competitive from a merely economical standpoint.

This aim, these objects and others that will become better apparent hereinafter are achieved by a composite for geotechnics, building and the like with an impermeable layer, characterized in that it comprises a sheet-like element that is impermeable to fluids and has, monolithically therewith, elements that protrude on the first and second faces, on at least one of said faces there being a layer that is integrally coupled to said protruding elements to form, at said first and second faces, two separate drainage and/or protection and/or grip systems adapted to withstand intense compression along a direction that is substantially perpendicular to said sheet-like element.

BRIEF DESCRIPTION OF THE DRAWINGS

Further characteristics and advantages of the present invention will become better apparent from the description of some preferred but not exclusive embodiments of a composite for geotechnics, building and the like, with impermeable layer, illustrated by way of non-limiting example in the accompanying drawings, wherein.

WAYS OF CARRYING OUT THE INVENTION

Figure 1:
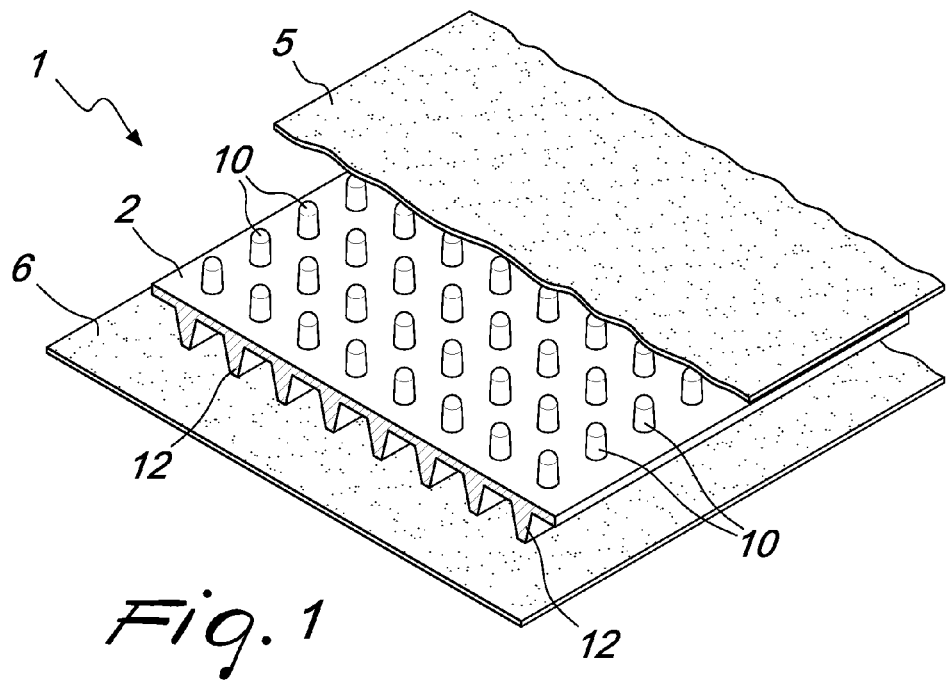
FIGS. 1 to 13 are layered perspective views of the composite according to the invention.

With reference to the figures, the composite for geotechnics, building and the like with impermeable layer, according to the invention, generally designated by the reference numeral 1, comprises a sheet-like element 2, which is impermeable to fluids, i.e., liquids and gases, and is advantageously constituted by a high- or medium-density polyethylene membrane with a thickness ranging advantageously from 0.75 mm to 2.5 mm.

An important peculiarity of the invention resides in that protruding elements are provided on the first and second faces of the sheet-like element 2, are coextruded monolithically with the sheet-like element, and have a height that ranges from 4 to 10 mm and thicknesses that can range from 1 to 5 mm; these protruding elements can have the most disparate shapes according to the specific use of the composite.

A peculiar feature of the invention resides in that at least one of the faces of the sheet-like element there is a first integrally coupled layer 5 and optionally a second layer 6 which is jointly connected to the other face, so as to create two separate draining and/or protection and/or grip systems, which are resistant to intense compression along a direction that is substantially perpendicular to the direction of the sheet-like element.

The sheet-like elements are devised so that, as will become better apparent hereinafter, they provide high hydraulic transmissivity in landfill coverings, which can be measured from 1.0 E-03 $m^2$/sec to 4.0 E-03 $m^2$/sec at a gradient of 0.33 and from 1.0 E-03 $m^2$/sec to 7.0 E-03 $m^2$/sec at a gradient of 0.1 when subjected to a pressure of 1000 psf (48 kPa).

The measurements are obtained by applying the ASTM D 4716 standard at the following conditions: rigid plate, Ottawa sand, geocomposite, rigid plate after a period of 100 hours.

The draining systems available on each of the faces that can be used in the building of basins are capable of providing high hydraulic transmissivity, which can be measured from 1.0 E-03 $m^2$/sec to 3.0 E-03 $m^2$/sec at a gradient of 0.1 when subjected to a pressure of 15,000 psf (720 kPa).

In this case also, the measurements have been obtained according to the ASTM D 4716 standard cited above.

The draining, protection or grip systems are capable of withstanding a high compression applied by the weight of the material that covers the membrane without undergoing collapses or failures, i.e., are capable of withstanding pressures up to 5000 psf (240 kPa) for protrusions with a single structure, up to 20,000 psf (960 kPa) for protrusions with interconnected top, and up to 25,000 psf (1200 kPa) for continuous protrusions.

In the embodiment according to the invention, the individual components of the composite, i.e., the sheet-like element, the protruding elements and the layers are mutually coupled and therefore the problem of the mutual sliding of the individual components, which might compromise the entire work, is solved.

The angle of friction between the laminated layers on the sheet-like element and the covering or covered material increases considerably, and therefore it is possible to use the composite in increasingly critical conditions and with increasing slopes. In particular, it is possible to use the composite with slopes from 2.5:1 to 2:1, for composite with layers on both sides, and from 2:1 to 1.5:1 for composites with an outer layer on a single face and with protruding elements that interact with the ground.

In practical execution, the protruding elements are provided by means of the same material as the sheet-like element or by using plastics of a different grade, in order to increase the degree of resistance to compression and/or heat-sealing capability according to the requirements.

The layers 5 and 6 can be constituted by non-woven fabrics with a grammage preferably ranging from 125 to 330 $g/m^2$, by woven fabrics with a grammage ranging from 75 to 220 g/m², by plastic nets with a grammage ranging from 150 to 400 g/m², and by membranes with a thickness ranging from 0.50 to 2 mm.

The protruding elements can assume different shapes, and thus, as shown in FIG. 1, on one face there are protruding elements 10 that are substantially frustum-shaped and are arranged on an orderly fashion in rows and columns, whereas on the other face there are cusp-shaped ridges 12 which extend continuously.

The layers 5 and 6 are then applied to both faces, so as to be able to provide the two distinct drainage and protection systems.

Figure 2:
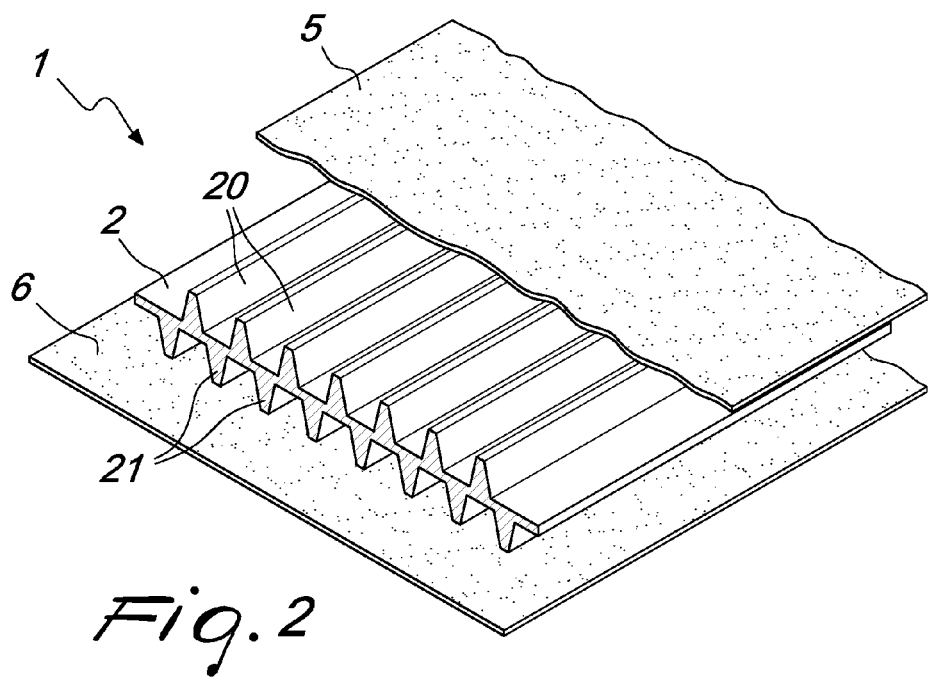

With reference to FIG. 2, on the sheet-like element, again designated by the reference numeral 2, there are protruding elements, constituted by a first ridge 20 on one face and by a second ridge 21 on the other face, which are parallel and offset with respect to each other.

In this case also, it is possible to provide the layers 5 and 6 so as to be able to provide the two separate drainage and protection systems.

Figure 3:
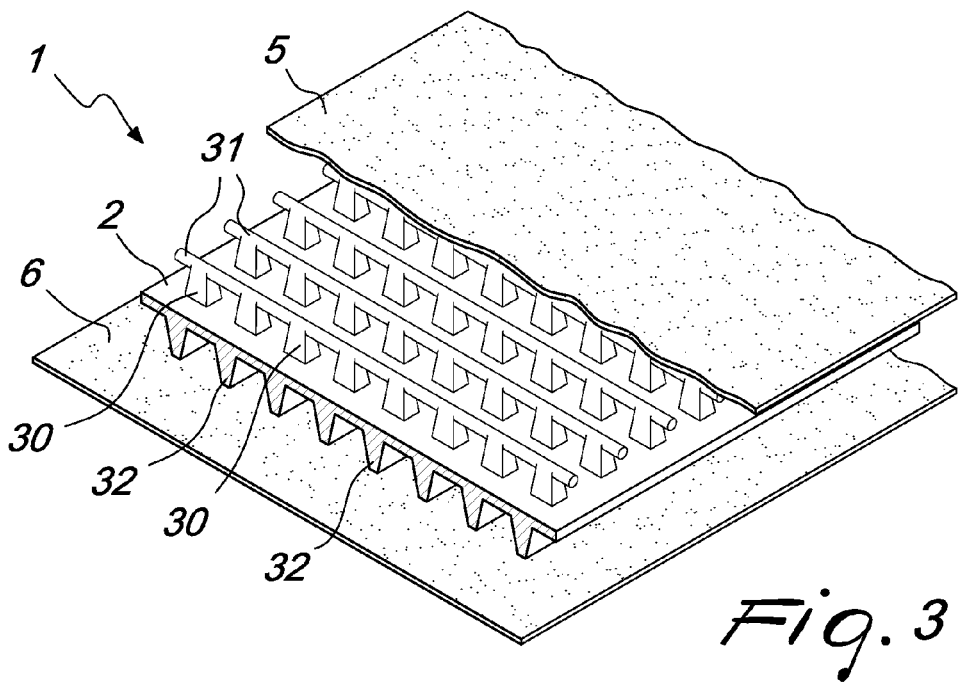

With reference to FIG. 3, pyramid-shaped protruding elements 30 are provided on one face of the sheet-like element which are spaced one another and joined by a continuous filament 31, whereas on the other face there is a transverse ridge 32 that has a continuous shape.

The layers 5 and 6 are provided advantageously on both faces, so as to be able to provide the two distinct drainage and protection systems.

Figure 4:
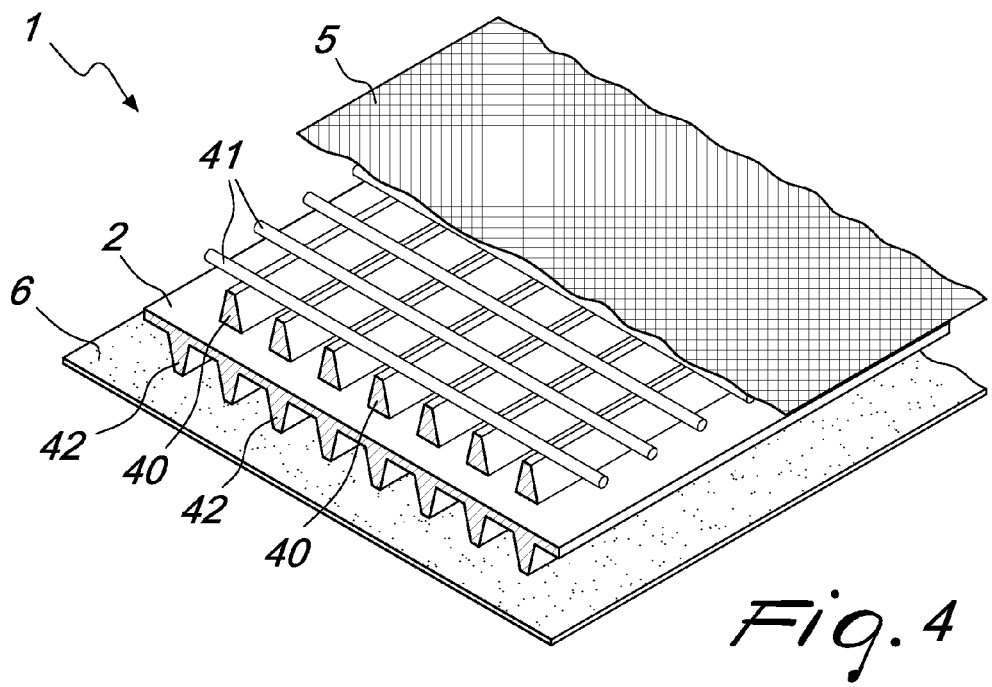

With reference to FIG. 4, the composite 1 has, on a face of the sheet-like element, first trapezoidal ridges 40, which extend parallel to each other and are joined by transverse filaments 41, which are arranged on the upper end, and on the opposite face there are second trapezoidal ridges 42, which are interleaved with the first trapezoidal ridges 40.

In this case also, the layers 5 and 6 are provided so as to be able to provide the two separate drainage and protection systems; these layers can be of different types.

Figure 5:
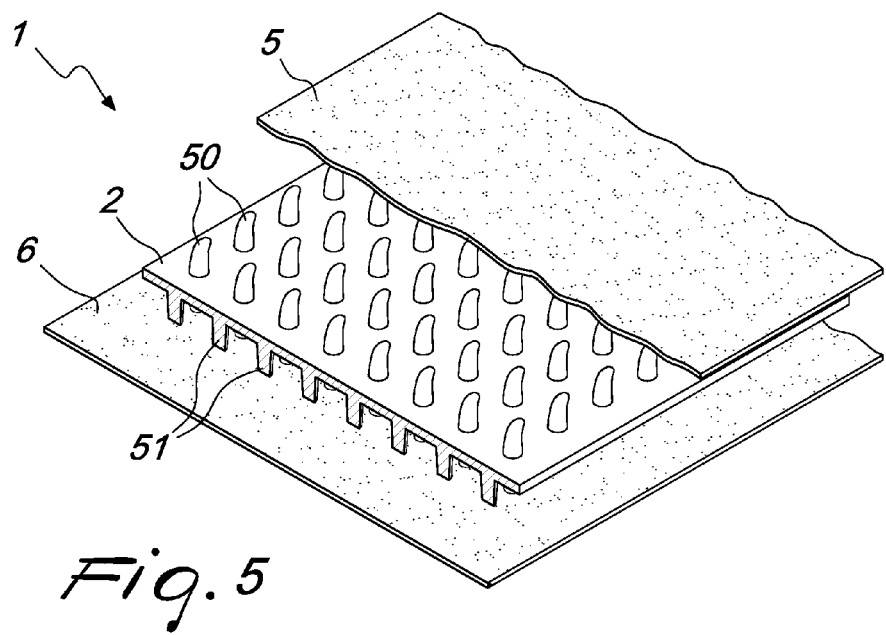

With reference to FIG. 5, the composite 1 has first cusp-shaped protruding elements 50 on one face and second cusp-shaped protruding elements 51 on the other face, which are coupled to layers 5 and 6 which can be constituted by a net with fine mesh and by a sheath, so as to create, on the two opposite faces, a permeable system and an impermeable system.

Figure 6:
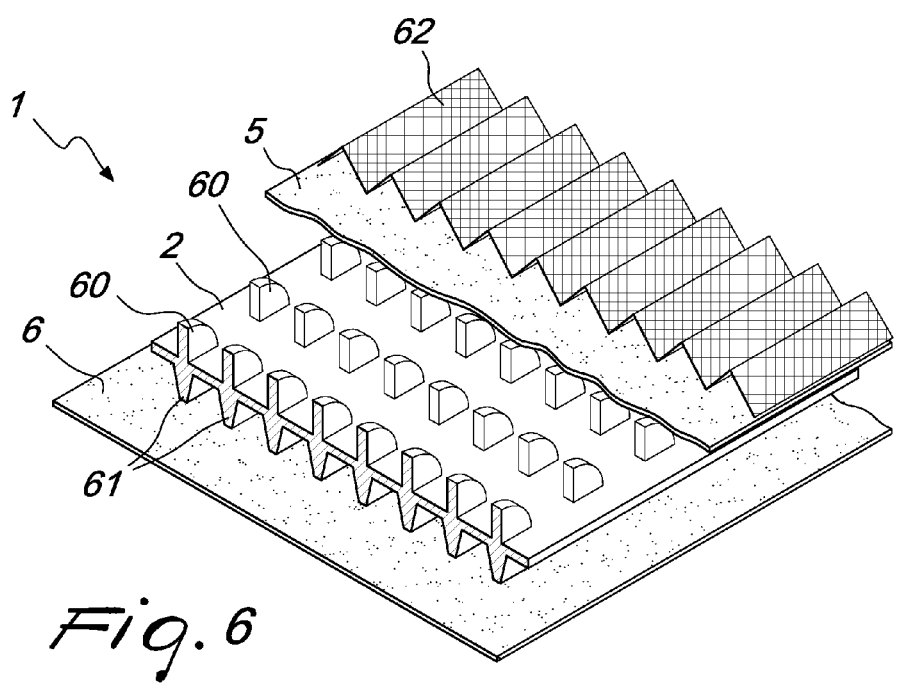

With reference to FIG. 6, on one face the composite has sector-shaped protruding elements 60, whereas on the opposite face there are longitudinal ridges 61.

It is also possible to provide a grid-like element 62, which is connected to one of the layers, for example to the layer 5, so as to create undulations that increase the degree of friction with the covering soil.

Figure 7:
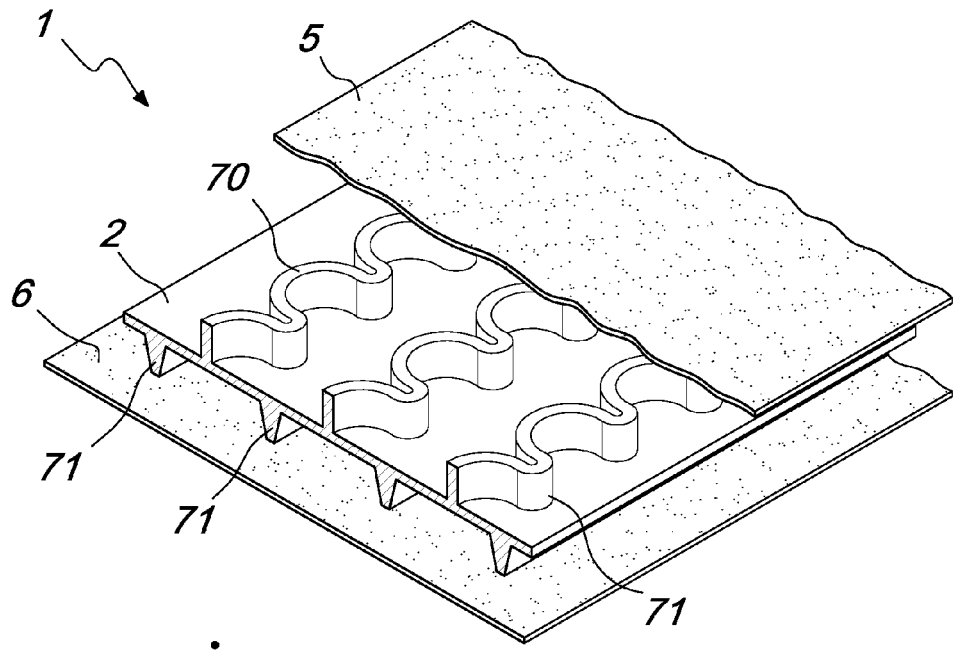

With reference to FIG. 7, the composite 1 has undulated protruding elements 70 on one side and rectilinear protruding elements 71 on the other side, so as to increase compression resistance and obtain two distinct drainage and protection systems that are more resistant.

Figure 8:
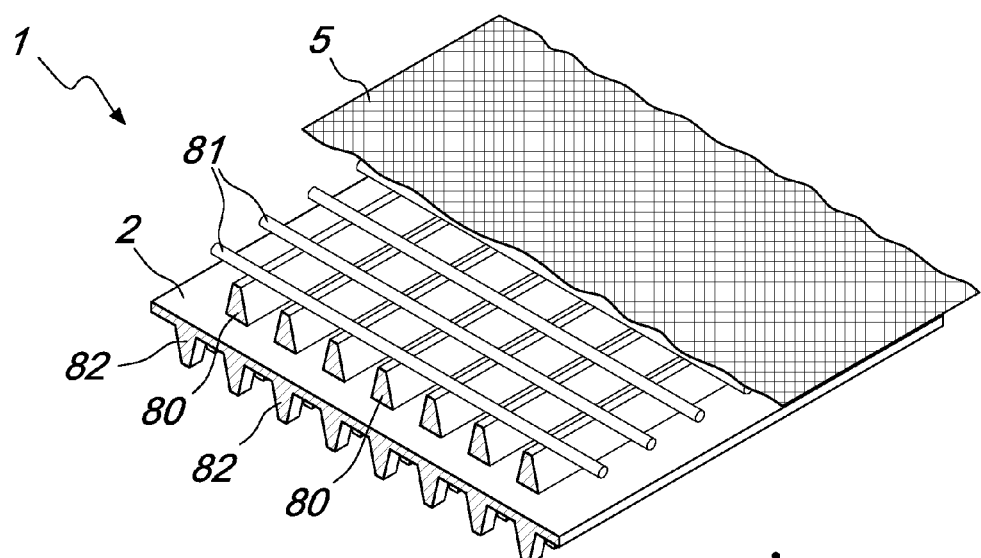

The solution of FIG. 8 refers to a composite 1 in which on the impermeable sheet-like element 2 there are, on one face, continuous protruding elements 80 joined by filament-like cross-members 81, and on the other face cusp-shaped elements 82, which are designed to provide a grip system in contact with the covered material.

Substantially, the solution shown in FIG. 8 provides a drainage and spacing system at the face provided with the elements 80, while the underlying face simply has a grip function.

Figure 9:
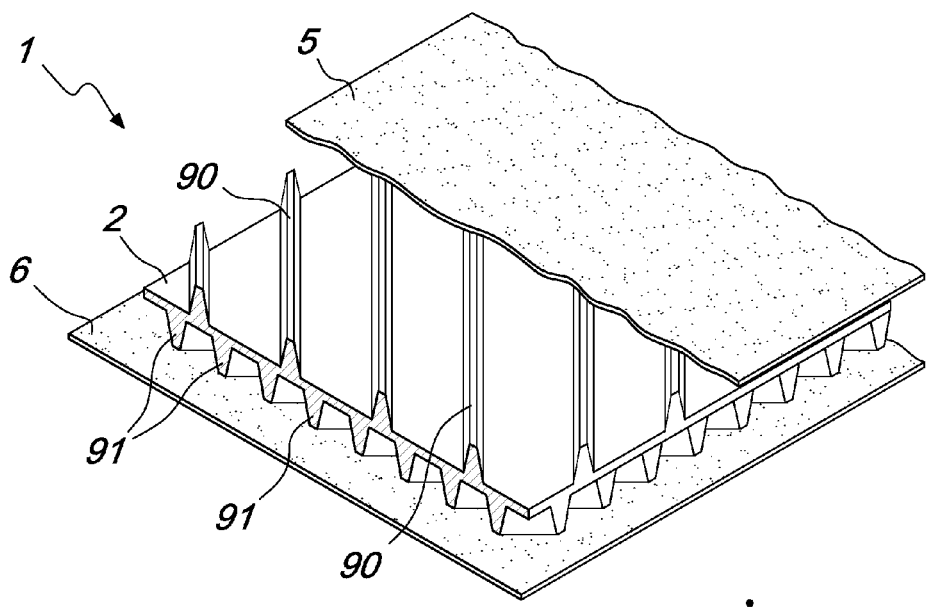

The embodiment shown in FIG. 9 relates to a composite 1, in which rectilinear and mutually substantially perpendicular sheet-like elements, respectively 90 and 91, are coextruded on the impermeable sheet-like element 2, thus obtaining the possibility to provide drainage in two mutually opposite and perpendicular directions.

Figure 10:
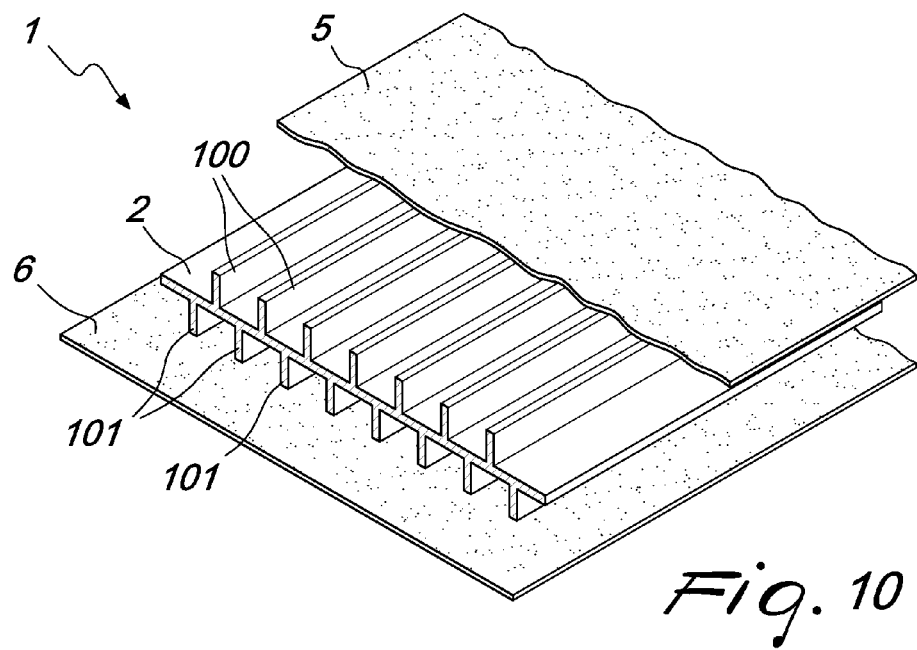

The solution in FIG. 10 has, on both faces, first straight bars 100 and second straight bars 101, which extend substantially parallel to each other and are connected by their free ends to the layers 5 and 6, which can be identical or of different types depending on the specific embodiment to be obtained.

Figure 11:
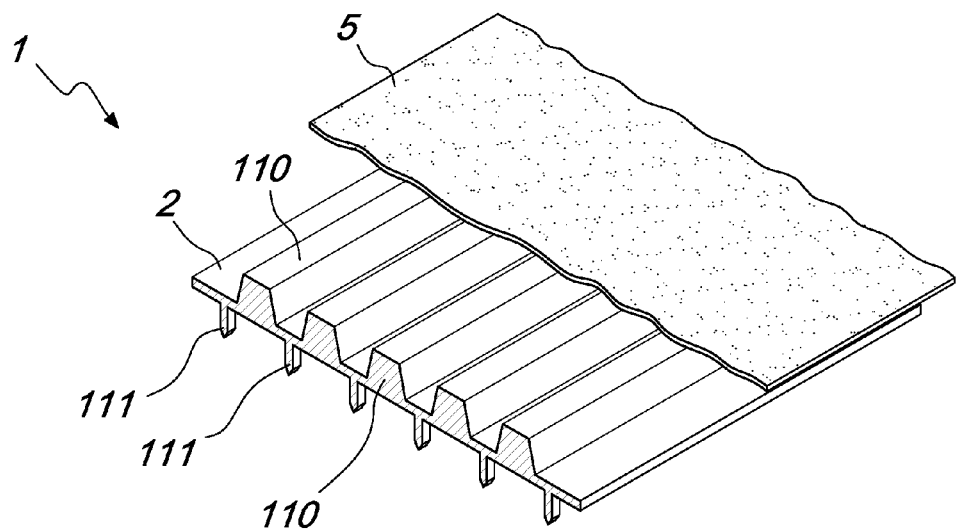

The solution shown in FIG. 11 has a sheet-like element 2, on one face of which there are protruding elements, constituted by trapezoidal bars 110 which extend parallel to each other, whereas on the other face there are cusp-shaped insertion elements 111 which have predominantly a grip function and thus can increase the verticality of the installation.

Figure 12:
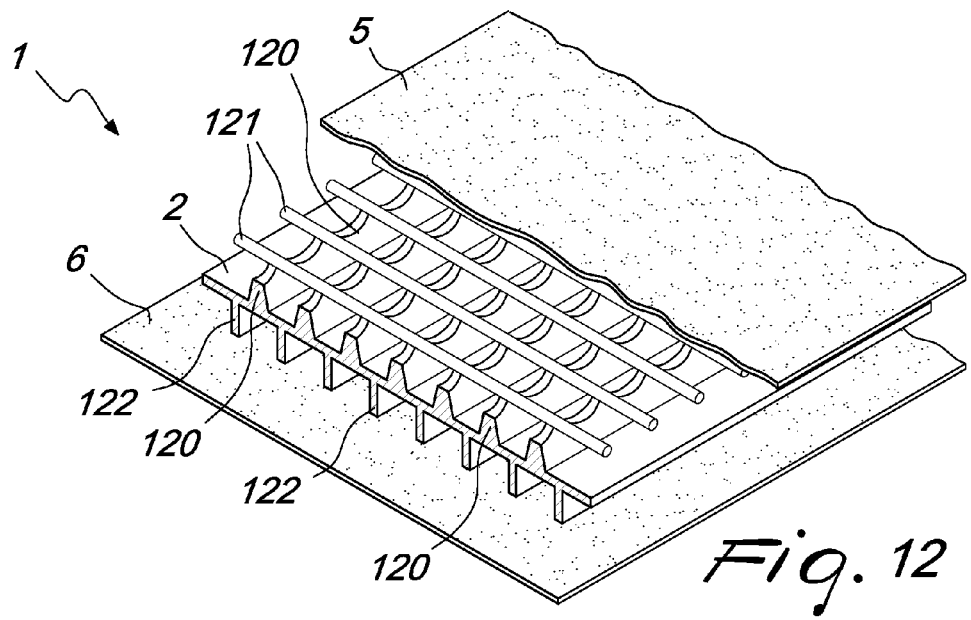

The composite shown in FIG. 12 has, on one face, protruding elements constituted by continuous bars with an undulated edge 120 joined by cross-members 121, whereas on the other face there are thin continuous bars 122.

The layers 5 and 6 can be of different types and can be, for example, impermeable, so as to create regions that can be crossed by liquids or gases, even of a different nature.

Figure 13:
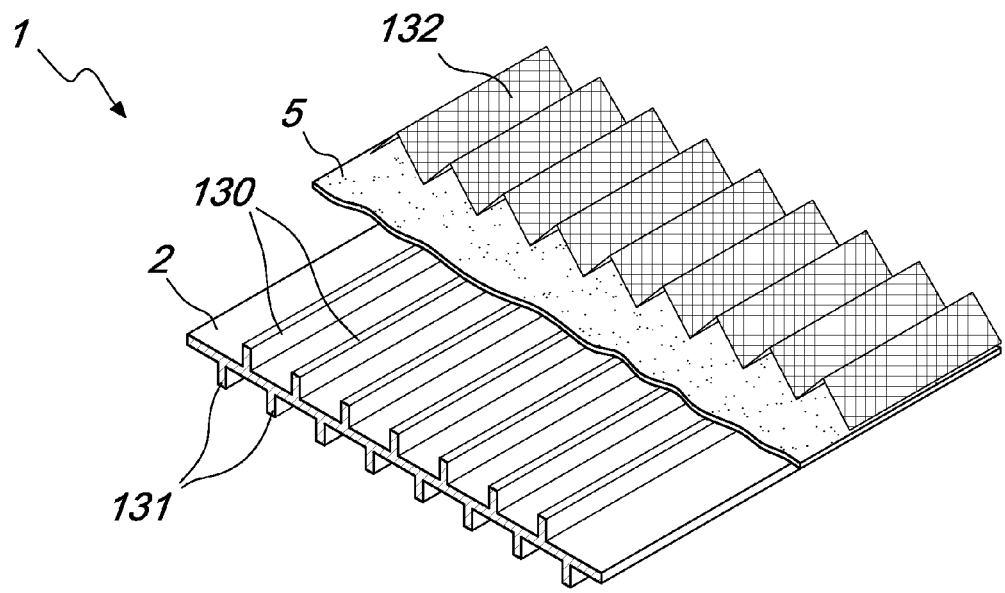

The solution of FIG. 13 refers to a composite in which the protruding elements are constituted by first ridges 130 and second ridges 131; at the first ridges there is the layer 5, with a pleated grid-like material 132 optionally applied, while the remaining ridges, by not being provided with the covering layer, may act as an element for interaction with ground.

Figure 14:
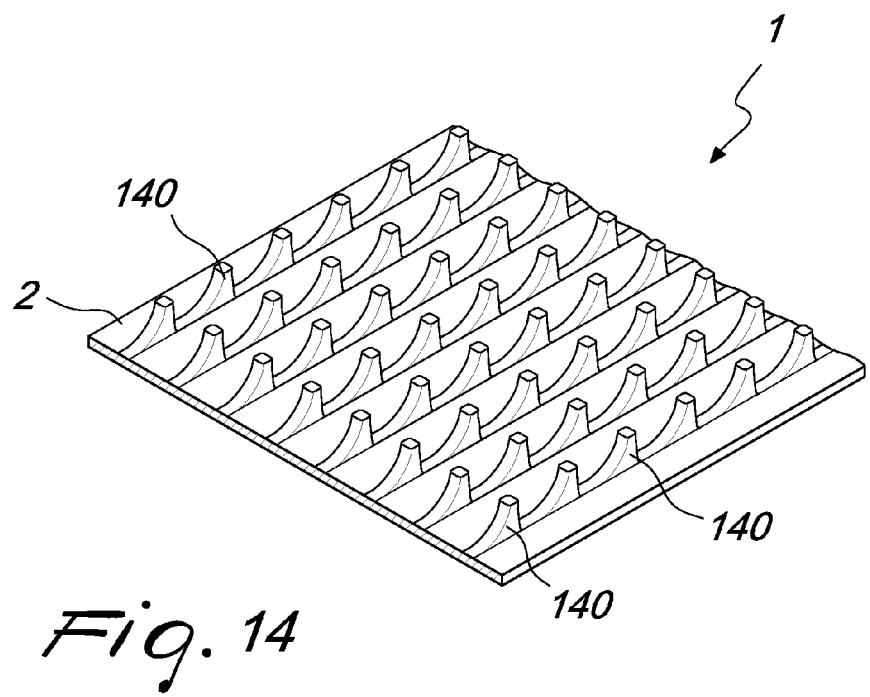
FIG. 14 is a schematic view of a particular shape of the protruding elements.

With reference to FIG. 14, a particular embodiment of the protruding elements is shown which are constituted by wedge-like protrusions 140, which illustrate a possible further embodiment, without altering the concept that the protruding elements on the two faces of the sheet-like element may be coupled in any manner and shaped in any manner.

Figure 15:
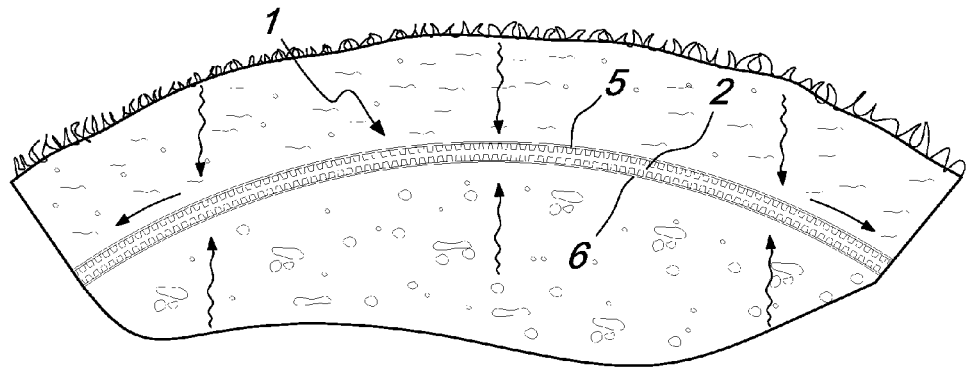
FIG. 15 is a schematic view of the composite applied to close a landfill.

In practical use, the composites illustrated above may have several uses; thus, for example, as shown in FIG. 15, in the case of landfills, the composite can be used in the step of final covering, when it is necessary to seal the loads and cover them with natural soil; in this case, a composite is available with a system which, at the upper part, contains the covering soil and drains rainwater and in the lower part retains and drains the gases generated by waste decomposition.

Figure 16:
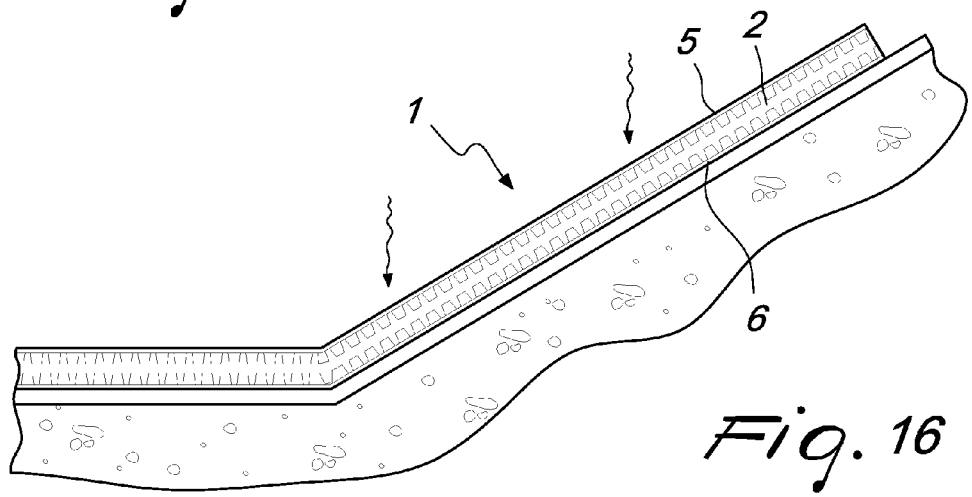
FIG. 16 is a schematic view of the composite arranged on the bottom of a landfill.

In the embodiment shown in FIG. 16, the composite 1 is used in providing the basin of landfills and in all cases in which it is necessary to contain waste and filter and drain sludge.

In this case, one has a composite with a system that contains, in an upward region, the waste without being damaged and drains the percolate, while the system arranged on the lower face creates an interspace for blocking any leaks of percolate thanks to the presence of an impermeable layer 6 or fabric and another sheath which is already positioned.

Figure 17:
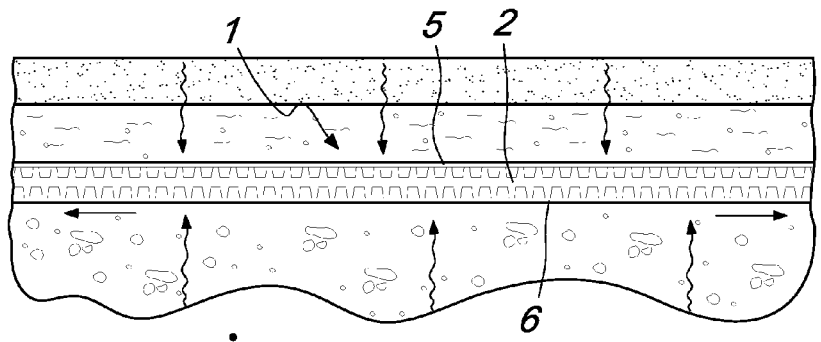
FIG. 17 is a view of the composite arranged beneath a roadbed as a separation element in polluted environments.

In FIG. 17, the composite 1 is used in the provision of roads in contaminated regions, where it is necessary to prevent contamination between surface water and underground water.

The composite is able to block, and drain laterally the water that arrives from above and likewise to prevent polluted water that originates from the underground to rise to the surface, being blocked and drained laterally.

Contamination of the soil or of underlying aquifers is thus avoided and at the same time the liquids that can compromise the strength of the soil and the stability of the corresponding road surface are drained from the soil.

Figure 18:
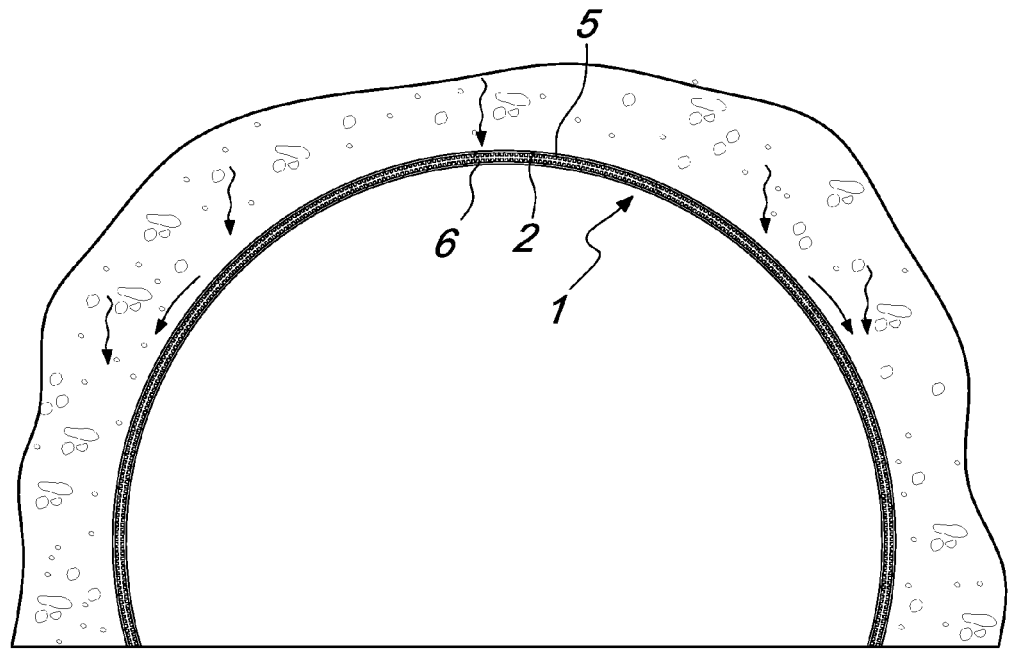
FIG. 18 is a view of the composite used in the construction of tunnels.

In FIG. 18, the composite is used to provide tunnels where it is necessary to block and drain water that filters through the rock.

The composite allows to line the walls, providing a solution that allows to space and drain water infiltrations and offers externally a grip surface to which the covering material, such as spray-on concrete and the like, can be made to adhere.

Figure 19:
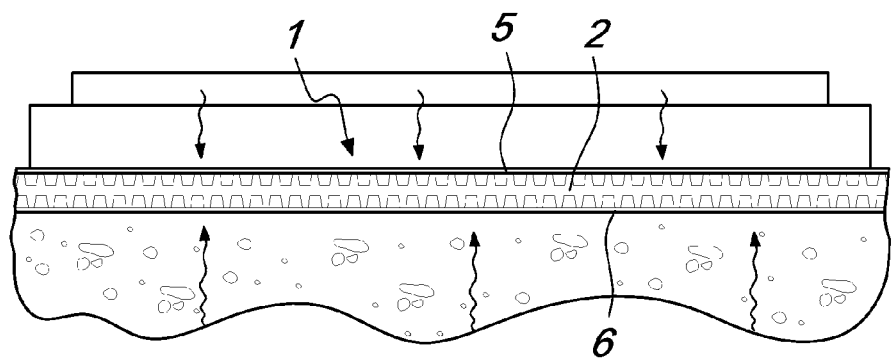
FIG. 19 is a view of the composite used in the building industry for buildings on contaminated land or land that is rich in organic material.

In FIG. 19, the composite 1 is used in buildings provided on soil that is contaminated or rich in organic material that generates gases and therefore it is necessary to block the gases and dispose of them and at the same time prevent rainwater from going underground, feeding fermentation further.

In this case, the composite 1 allows to perform separation, facilitating for both layers the drainage of rainwater, of the gases, and of the contaminated water without allowing further contamination.

Figure 20:
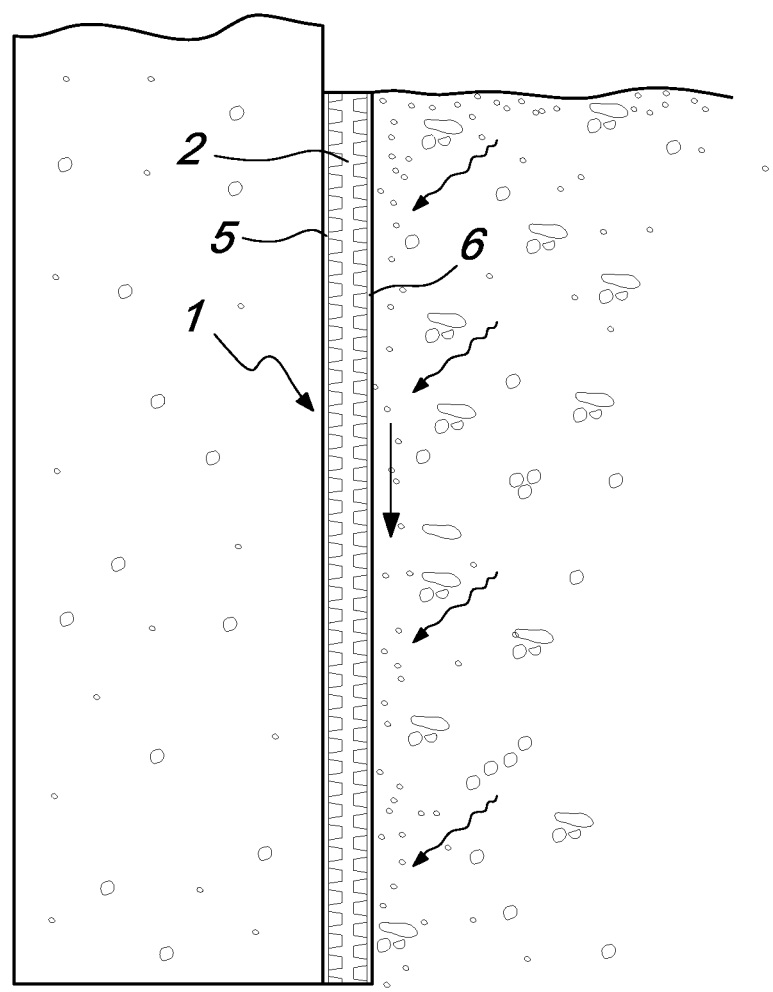
FIG. 20 is a view of the composite arranged vertically in order to act as a draining element.

The composite 1, as shown in FIG. 20, can also be used along vertical planes in all cases in which it is necessary to provide a draining and spacing system to eliminate the problems of infiltrations and damp.

From what has been described above it is evident that the invention achieves the proposed aim and objects, and in particular the fact is stressed that a particularly practical and functional embodiment is provided which allows to have all the systems needed to drain both liquids and gases already preset, with adequate and correct positioning at the installation site.

The invention thus conceived is susceptible of numerous modifications and variations, all of which are within the scope of the appended claims.

All the details may further be replaced with other technically equivalent elements.

In practice, the materials used, so long as they are compatible with the specific use, as well as the contingent shapes and dimensions, may be any according to requirements.

The disclosures in Italian Patent Application no. MI2007A002113, from which this application claims priority, are incorporated herein by reference.

The invention claimed is:

1. A composite for geotechnics and building comprising:
   an impermeable layer including a sheet-like element that is impermeable to fluids and carrying, monolithically therewith, elements that protrude on the first and second faces, and
   on at least one of said faces, a further layer that is integrally coupled to said protruding elements,
   wherein said further layer is constituted by one selected from the group of:
   non-woven fabrics with a grammage ranging from 125 to 330 $g/m^2$,
   woven fabrics with a grammage ranging from 75 to 220 $g/m^2$, and
   plastic nets with a grammage ranging from 150 to 400 $g/m^2$.

2. The composite according to claim 1, wherein said sheet-like element has a thickness ranging from 0.75 to 2.5 mm.

3. The composite according to claim 1, wherein said protruding elements have a height ranging from 4 to 10 mm and a thickness ranging from 1 to 5 mm.

4. The composite according to claim 1, having a hydraulic transmissivity ranging from 1.0 E-03 $m^2$/sec to 7.0 E-03 $m^2$/sec at a gradient of 0.1 with a pressure of 48 kPa in an application as covering for landfills.

5. The composite according to claim 1, having a hydraulic transmissivity ranging from 1.0 E-03 $m^2$/sec to 3.0 E-03 $m^2$/sec at a gradient of 0.1 with a pressure of 720 kPa in an application for basins of landfills.

6. The composite according to claim 1, wherein said protruding elements are constituted by substantially frustum-shaped elements on one face and by ridges that extend continuously on the other face.

7. The composite according to claim 1, wherein said protruding elements comprise a first ridge on one face and a second ridge on the other face, said ridges being mutually parallel and mutually offset.

8. The composite according to claim 1, wherein said protruding elements comprise cusp-shaped protruding elements which are mutually spaced and joined by a continuous filament, a continuous transverse ridge being provided on the other face.

9. The composite according to claim 1, comprising first trapezoidal ridges on one face which extend parallel to each other and are joined by transverse filaments arranged on the upper ends, second trapezoidal ridges being provided on the other face and being interleaved with said first trapezoidal ridges.

10. The composite according to claim 1, wherein said protruding elements are constituted by conical protruding elements on one face, and by cusp-shaped protruding elements on the other face.

11. The composite according to claim 1, wherein said protruding elements are constituted by sector-shaped protruding elements on one face, and by longitudinal ridges on the other face.

12. The composite according to claim 1, wherein said protruding elements comprise undulated protruding elements on one side and rectilinear protruding elements on the other side.

13. The composite according to claim 1, wherein said protruding elements have continuous protruding elements which are joined by filament-like cross-members on one face and cusp-shaped elements on the other face.

14. The composite according to claim 1, wherein said protruding elements comprise mutually substantially perpendicular rectilinear rod-like elements on the opposite faces.

15. The composite according to claim 1, wherein said protruding elements comprise first straight bars on one face and second straight bars on the opposite face, said bars being mutually substantially parallel.

16. The composite according to claim 1, wherein said protruding elements comprise trapezoidal bars that extend parallel to each other on one face and, on the other face, insertion bars which have a grip function.

17. The composite according to claim 1, wherein said protruding elements comprise continuous bars joined by cross-members on one face and thin continuous bars on the other face.

18. The composite according to claim 1, wherein said protruding elements comprise first ridges on one face and second ridges on the other face.

19. The composite according to claim 1, comprising, on at least one of said layers, a pleated grid-like material.

20. The composite according to claim 1, comprising protruding elements provided by means of plastics of a different grade with respect to said sheet-like element in order to increase the degree of resistance to compression and/or heat-sealing capability according to the requirements.

21. A composite for geotechnics and building comprising:
   an impermeable layer including a sheet-like element that is impermeable to fluids and carrying, monolithically therewith, elements that protrude on first and second faces of the layer, and on at least one of said faces, a further layer that is integrally coupled to said protruding elements, said further layer comprising an outermost layer of the composite, wherein said further layer is constituted by water permeable material to form, on at least one of said first and second faces, at least one separate drainage and/or protection and/or grip system adapted to withstand intense compression along a direction that is substantially perpendicular to said sheet-like element, and wherein said protruding elements withstand compression pressures of more than 240 kPa.

22. The composite according to claim 21, wherein said further layer or layers are constituted by non-woven fabrics with a grammage ranging from 125 to 330 g/m$^2$.

23. The composite according to claim 21, wherein said further layer or layers are constituted by woven fabrics with a grammage ranging from 75 to 220 g/m$^2$.

24. The composite according to claim 21, wherein said further layer or layers are constituted by plastic nets with a grammage ranging from 150 to 400 g/m$^2$.

25. The composite according to claim 21, wherein said further layer or layers are constituted by membranes with a thickness ranging from 0.50 to 2 mm.

26. A composite for geotechnics and building comprising:
an impermeable layer including a sheet-like element that is impermeable to fluids and carrying, monolithically therewith, elements that protrude on first and second faces of the layer, and
on at least one of said faces a further layer that is integrally coupled to said protruding elements,
wherein said composite forms, at one of said first and second faces, a separate drainage system adapted to withstand intense compression along a direction that is substantially perpendicular to said sheet-like element so as to maintain spacing between the impermeable layer and said further layer,
wherein the sheet-like element, the protruding elements and the further layer are mutually coupled such as to have no mutual sliding, and
wherein said protruding elements withstand compression pressures of more than 240 kPa.

27. The composite according to claim 26, wherein said sheet-like element has a thickness ranging from 0.75 to 2.5 mm.

28. The composite according to claim 26, wherein said protruding elements have a height ranging from 4 to 10 mm and a thickness ranging from 1 to 5 mm.

29. The composite according to claim 26, wherein said further layer is constituted by one selected from the group of:
non-woven fabrics with a grammage ranging from 125 to 330 g/m$^2$,
woven fabrics with a grammage ranging from 75 to 220 g/m$^2$, and
plastic nets with a grammage ranging from 150 to 400 g/m$^2$.

30. The composite according to claim 26, wherein said protruding elements comprise by substantially frustum-shaped elements on one face and by ridges that extend continuously on the other face.

31. The composite according to claim 26, wherein said protruding elements comprise a first ridge on one face and a second ridge on the other face, said ridges being mutually parallel and mutually offset.

32. The composite according to claim 26, wherein said protruding elements comprise cusp-shaped protruding elements which are mutually spaced and joined by a continuous filament, a continuous transverse ridge being provided on the other face.

33. The composite according to claim 26, comprising first trapezoidal ridges on one face which extend parallel to each other and are joined by transverse filaments arranged on the upper ends, second trapezoidal ridges being provided on the other face and being interleaved with said first trapezoidal ridges.

34. The composite according to claim 26, wherein said protruding elements comprise conical protruding elements on one face, and by cusp-shaped protruding elements on the other face.

35. The composite according to claim 26, wherein said protruding elements comprise sector-shaped protruding elements on one face, and by longitudinal ridges on the other face.

36. The composite according to claim 26, wherein said protruding elements comprise undulated protruding elements on one side and rectilinear protruding elements on the other side.

37. The composite according to claim 26, wherein said protruding elements have continuous protruding elements which are joined by filament-like cross-members on one face and cusp-shaped elements on the other face.

38. The composite according to claim 26, wherein said protruding elements comprise mutually substantially perpendicular rectilinear rod-like elements on the opposite faces.

39. The composite according to claim 26, wherein said protruding elements comprise first straight bars on one face and second straight bars on the opposite face, said bars being mutually substantially parallel.

40. The composite according to claim 26, wherein said protruding elements comprise trapezoidal bars that extend parallel to each other on one face and, on the other face, insertion bars which have a grip function.

41. The composite according to claim 26, wherein said protruding elements comprise continuous bars joined by cross-members on one face and thin continuous bars on the other face.

42. A composite for geotechnics and building comprising:
an impermeable layer including a sheet-like element that is impermeable to fluids and carrying, monolithically therewith, elements that protrude on first and second faces of the layer, and
on at least one of said faces a further layer that is integrally coupled to said protruding elements,
wherein said composite forms, at one of said first and second faces, a separate drainage system adapted to withstand intense compression along a direction that is substantially perpendicular to said sheet-like element so as to maintain spacing between the impermeable layer and said further layer,
wherein the sheet-like element, the protruding elements and the further layer are mutually coupled such as to have no mutual sliding, and
wherein said protruding elements comprise cusp-shaped protruding elements which are mutually spaced and joined by a continuous filament, a continuous transverse ridge being provided on the other face.

43. A composite for geotechnics and building comprising:
an impermeable layer including a sheet-like element that is impermeable to fluids and carrying, monolithically therewith, elements that protrude on first and second faces of the layer, and
on at least one of said faces a further layer that is integrally coupled to said protruding elements, wherein said composite forms, at one of said first and second faces, a separate drainage system adapted to withstand intense compression along a direction that is substantially perpendicular to said sheet-like element so as to maintain spacing between the impermeable layer and said further layer, wherein the sheet-like element, the protruding elements and the further layer are mutually coupled such as to have no mutual sliding, the composite further comprising first trapezoidal ridges on one face which extend parallel to each other and are joined by transverse filaments arranged on the upper ends, second trapezoidal ridges being provided on the other face and being interleaved with said first trapezoidal ridges.

44. A composite for geotechnics and building comprising:

an impermeable layer including a sheet-like element that is impermeable to fluids and carrying, monolithically therewith, elements that protrude on first and second faces of the layer, and on at least one of said faces a further layer that is integrally coupled to said protruding elements, wherein said composite forms, at one of said first and second faces, a separate drainage system adapted to withstand intense compression along a direction that is substantially perpendicular to said sheet-like element so as to maintain spacing between the impermeable layer and said further layer, wherein the sheet-like element, the protruding elements and the further layer are mutually coupled such as to have no mutual sliding, and wherein said protruding elements include continuous protruding elements which are joined by filament-like cross-members on one face, and cusp-shaped elements on the other face.

* * * * *